US011299192B2

(12) United States Patent
Hirschfeld et al.

(10) Patent No.: US 11,299,192 B2
(45) Date of Patent: Apr. 12, 2022

(54) MOTOR VEHICLE

(71) Applicant: Leopold Kostal GmbH & Co. KG, Luedenscheid (DE)

(72) Inventors: Klaus Hirschfeld, Luedenscheid (DE); Peter Floeper, Meinerzhagen (DE); Martin Deitmerg, Luedenscheid (DE); Knut Moldenhauer, Hagen (DE); Ludwig Feldmueller, Schwerte (DE)

(73) Assignee: KOSTAL Automobil Elektrik GmbH & Co. KG, Luedenscheid (DE)

( * ) Notice: Subject to any disclaimer, the term of this patent is extended or adjusted under 35 U.S.C. 154(b) by 326 days.

(21) Appl. No.: 16/781,249

(22) Filed: Feb. 4, 2020

(65) Prior Publication Data
US 2020/0172145 A1 Jun. 4, 2020

Related U.S. Application Data

(63) Continuation of application No. PCT/EP2018/071743, filed on Aug. 10, 2018.

(30) Foreign Application Priority Data

Aug. 17, 2017 (DE) ..................... 10 2017 007 841.6

(51) Int. Cl.
*B62D 1/185* (2006.01)
*B60K 35/00* (2006.01)
*B62D 1/183* (2006.01)

(52) U.S. Cl.
CPC ............ *B62D 1/185* (2013.01); *B60K 35/00* (2013.01); *B62D 1/183* (2013.01);
(Continued)

(58) Field of Classification Search
CPC ........ B62D 1/185; B62D 1/183; B62D 1/181; B62D 1/18; B60K 35/00;
(Continued)

(56) References Cited

U.S. PATENT DOCUMENTS 10,780,915 B2 * 9/2020 Rakouth ................ B62D 1/183
11,061,401 B2 * 7/2021 Koehler ............... B62D 5/0409
(Continued)

FOREIGN PATENT DOCUMENTS

DE 8907647 U1 8/1989
DE 19824420 A1 * 12/1999 ............. B60K 35/00
(Continued)

OTHER PUBLICATIONS

European Patent Office, International Search Report for International Application No. PCT/EP2018/071743, dated Dec. 3, 2018.
(Continued)

*Primary Examiner* — Drew J Brown
(74) *Attorney, Agent, or Firm* — Brooks Kushman P.C.

(57) ABSTRACT

An operating arrangement for a vehicle includes a steering column retractable into and extendable out of a dashboard, a steering shaft that is retractable and extendable relative to the steering column, a steering wheel on an end of the steering shaft, and a steering column module arranged on the steering column between the steering wheel and the dashboard. The steering column module has a screen positioned behind the steering wheel. In a manual vehicle driving mode, the steering column is extended out of the dashboard to position the steering wheel and the steering column module away from the dashboard. In an automatic (or autonomous) vehicle mode, the steering column is retracted into the dashboard to position the steering column module against the dashboard and the steering shaft is retracted relative to the steering column to position the steering wheel adjacent the dashboard with the screen resting against the steering wheel.

20 Claims, 3 Drawing Sheets

(52) U.S. Cl.
CPC   *B60K 2370/1438* (2019.05); *B60K 2370/152* (2019.05); *B60K 2370/175* (2019.05); *B60K 2370/782* (2019.05)

(58) Field of Classification Search
CPC ...... B60K 2370/1438; B60K 2370/152; B60K 2370/175; B60K 2370/782
See application file for complete search history.

(56) References Cited

U.S. PATENT DOCUMENTS

| | | |
|---|---|---|
| 2007/0013181 A1 | 1/2007 | Heck |
| 2014/0277896 A1 | 9/2014 | Lathrop et al. |
| 2015/0142246 A1 | 5/2015 | Cuddihy et al. |
| 2016/0375926 A1 | 12/2016 | Lubischer et al. |
| 2017/0029009 A1 | 2/2017 | Rouleau |
| 2017/0113712 A1 | 4/2017 | Watz et al. |
| 2018/0086297 A1* | 3/2018 | Bodtker ................. B60K 35/00 |
| 2019/0016365 A1* | 1/2019 | Swamidason .......... B62D 5/006 |
| 2020/0339176 A1* | 10/2020 | Cao ........................ B62D 1/183 |

FOREIGN PATENT DOCUMENTS

| | | | | |
|---|---|---|---|---|
| DE | 10204596 A1 | 8/2003 | | |
| DE | 102005032706 A1 | 1/2007 | | |
| DE | 102016011461 A1 * | 4/2017 | ............ | B60K 35/00 |
| DE | 102019106545 A1 * | 9/2020 | | |
| DE | 102019108963 A1 * | 10/2020 | | |
| DE | 102019112875 A1 * | 11/2020 | | |

OTHER PUBLICATIONS

German Patent and Trademark Office, German Search Report for German Patent Application No. 10 2017 007 841.6 dated Aug. 1, 2018.

* cited by examiner

MOTOR VEHICLE

CROSS-REFERENCE TO RELATED APPLICATIONS

This application is a continuation of International Application No. PCT/EP2018/071743, published in German, with an International filing date of Aug. 10, 2018, which claims priority to DE 10 2017 007 841.6, filed Aug. 17, 2017; the disclosures of which are hereby incorporated in their entirety by reference herein.

TECHNICAL FIELD

The present invention relates to a motor vehicle having a manual driving mode and an automatic (i.e., autonomous) driving mode, wherein the vehicle has a steering wheel and a steering column that is adjustable in length by an actuating mechanism, the actuating mechanism pulls the steering wheel close to a dashboard of the vehicle in the automatic driving mode, and a screen which rests against the steering wheel in the automatic driving mode is situated behind the steering wheel.

BACKGROUND

In conceptual studies for electric vehicles, prototypes are known (https://ecomento.tv/2017/03/03/so-faehrt-sich-vws-elektroauto-studie-i-d-videos/) in which an electric vehicle is operable in a manual driving mode and in an autonomous driving mode. In the autonomous driving mode, the steering wheel is placed close to the dashboard or countersunk into a correspondingly shaped recess in the dashboard. When the steering wheel is positioned in this way, a screen situated on the dashboard is still discernible through the free space within the steering wheel rim.

The designs of such conceptual models differ greatly from those in current use. In present motor vehicles, it is customary to provide switch units, in particular lever switches for controlling directional signal lights and windshield wipers, on the steering column. In addition, a relatively large number of display elements and displays are mounted on the steering column as a so-called steering column module in the area of the steering wheel.

Such a steering column module is not described in the above-mentioned reference. Although a screen is provided here as a display element, it is situated on the dashboard. Situating control switches or switching levers on the steering column is not addressed at all in the above-mentioned reference.

Additionally, two problems arise in the use of a steering column module. First, the control elements would be situated in front of the screen, and to a greater or lesser extent would limit an unobstructed view of the screen. Second, in the autonomous driving mode, the control elements protruding from the steering column would hinder the steering wheel from resting directly against the screen.

SUMMARY

An object is to provide a motor vehicle, which for various driving modes of the vehicle in each case provides advantageous steering wheel positions and, at least for a manual driving mode, control elements that are situated on the steering column.

In embodiments of the present invention, this object is achieved in that the screen is a component of a steering column module situated on the steering column.

An embodiment of the present invention provides a motor vehicle having a manual driving mode and an automatic (i.e., autonomous) driving mode. The vehicle has a steering wheel, a steering column, a steering column module, and a dashboard. The steering wheel is situated on an end of the steering column. The steering column module is arranged on the steering column. The steering column is adjustable in length (i.e., longitudinally adjustable) by an actuating mechanism to be retractable into and extendable out of the dashboard. In the automatic driving mode, the steering column is retracted into the dashboard to thereby pull the steering wheel tightly against the dashboard. The steering column module has a screen which is arranged behind the steering wheel. In the automatic driving mode, the screen lies against the steering wheel.

In carrying out any of the above object and/or other objects, an operating arrangement for a vehicle operable in a manual driving mode and in an automatic driving mode is provided. The operating arrangement includes a steering column that is retractable into and extendable out of a dashboard. The steering column has a steering shaft that is retractable and extendable relative to the steering column. The operating arrangement further includes a steering wheel on an end of the steering shaft and a steering column module arranged on the steering column between the steering wheel and the dashboard. The steering column module has a screen positioned behind the steering wheel. In the manual driving mode, the steering column is extended out of the dashboard to position the steering wheel and the steering column module away from the dashboard. In the automatic driving mode, the steering column is retracted into the dashboard to position the steering column module against the dashboard and the steering shaft is retracted relative to the steering column to position the steering wheel adjacent the dashboard with the screen resting against the steering wheel.

The steering wheel may include a steering wheel rim. In this case, in the automatic driving mode, the steering shaft is retracted far enough relative to the steering column such that the screen is sunk into a free space within the steering wheel rim.

The steering column module may have at least one switch unit situated off from the screen on at least one side of the steering column module. At least one of the at least one switch unit may be a lever switch or a push switch.

In the automatic driving mode, the at least one switch unit may be concealed by the steering wheel and/or edges of the dashboard to be inaccessible. In the manual driving mode, the at least one switch unit may be exposed to be accessible.

The vehicle may be further operable in a semi-automatic driving mode. In the semi-automatic driving mode, the steering column is partially retracted into the dashboard to position the steering column module adjacent to the dashboard. In the semi-automatic driving mode, the at least one switch unit may be exposed to be accessible.

The screen may be a touchscreen. The screen may be a front face of the steering column module.

Further, in carrying out any of the above object and/or other objects, a vehicle operable in a manual driving mode and in an automatic driving mode is provided. The vehicle includes a dashboard and a steering column that is retractable into and extendable out of the dashboard. The steering column has a steering shaft that is retractable and extendable relative to the steering column. The vehicle further includes a steering wheel on an end of the steering shaft and a steering column module arranged on the steering column between the steering wheel and the dashboard. The steering column module has a screen positioned behind the steering wheel. In the manual driving mode, the steering column is extended out of the dashboard to position the steering wheel and the steering column module away from the dashboard. In the automatic driving mode, the steering column is retracted into the dashboard to position the steering column module against the dashboard and the steering shaft is retracted relative to the steering column to position the steering wheel adjacent the dashboard with the screen resting against the steering wheel.

The dashboard may include a recess. In this case, in the automatic driving mode, the steering column is retracted far enough into the dashboard such that the steering column module is completely countersunk into the recess of the dashboard and the steering shaft is retracted far enough relative to the steering column such that the steering wheel is at least partially countersunk into the recess of the dashboard.

Also, in carrying out any of the above object and/or other objects, another operating arrangement for a vehicle operable in a manual driving mode and in an automatic driving mode is provided. This operating arrangement includes a steering column that is retractable into and extendable out of a dashboard and a steering shaft that is retractable and extendable relative to the steering column. The steering shaft has an end extending out of the steering column. This operating arrangement further includes a steering wheel connected to the end of the steering shaft and a steering column module mounted on the steering column between the steering wheel and the dashboard. The steering column module has a screen positioned behind the steering wheel. In the manual driving mode, (i) the steering column is extended out of the dashboard to position the steering wheel and the steering column module away from the dashboard and (ii) the steering shaft is extended relative to the steering column such that the steering wheel is spaced apart from the steering column module at a given distance. In the driving automatic mode, (i) the steering column is retracted into the dashboard to position the steering column module against the dashboard and (ii) the steering shaft is retracted relative to the steering column such that the steering wheel is positioned against the steering column module with the screen resting against the steering wheel.

The vehicle may further operable in a semi-automatic driving mode. In this case, in the semi-automatic driving mode, (i) the steering column is partially retracted into the dashboard to position the steering column module adjacent to the dashboard and (ii) the steering shaft is extended relative to the steering column such that the steering wheel is spaced apart from the steering column module at the given distance.

In accordance with embodiments of the present invention, the concept of situating the screen on the steering column as a component of a steering column module provides the option of mounting a screen behind the steering wheel without the steering column module partially or completely concealing the screen on the dashboard. The screen thus remains clearly discernible at all times through the free space within the steering wheel rim. In addition, it is possible to provide switching elements, such as pushbuttons or lever switches for controlling directional signal lights and windshield wipers, on the side of the steering column module without this obstructing the view of the displays on the screen.

Situating the screen directly behind the steering wheel also opens the possibility of designing the screen as a touchscreen, so that the screen itself may be used as an operating element and switching element. In this way, control options that are variable, and thus versatile, may be situated in the direct vicinity of the steering wheel.

It is advantageous that these designs do not adversely affect the ability to position the steering wheel differently for various driving modes of the vehicle.

Embodiments of the present invention assume that the vehicle has a manual driving mode and an automatic (i.e., autonomous) driving mode. The manual driving mode provides that the primary user (i.e., the user at the driver's position) operates the vehicle in the conventional manner and steers by turning the steering wheel. The vehicle provides only supporting functions. The automatic driving mode allows autonomous operation of the vehicle, which functions without intervention by the user.

The vehicle may further have a semi-automatic (i.e., semi-autonomous) driving mode. The semi-automatic driving mode allows autonomous operation of the vehicle but which may be overridden at any time by an intervention by the primary user, for example by a movement of the steering wheel.

For the various driving modes, it is advantageous to position the steering wheel differently in each case with respect to the primary user. For example, in the automatic or semi-automatic driving mode, the steering wheel is positioned to provide additional free space and thus greater comfort in the interior of the vehicle. This is made possible by the steering column whose longitudinal component that protrudes into the interior of the vehicle is adjustable by an actuating mechanism. The longitudinal component is referred to herein as being "length-adjustable" (i.e., longitudinally adjustable) for short.

In the manual driving mode, the steering column is more or less completely extended from the dashboard so that the steering wheel is in an ergonomically favorable position for the user. The steering wheel and switching elements at the edge of the steering column module may thus be comfortably actuated by hand.

In the semi-automatic driving mode, the steering column is retracted partially into the dashboard so that the steering wheel and the switching elements of the steering column module are "out of the way" but still accessible at any time if necessary.

In the automatic driving mode, the steering wheel is brought close to the dashboard and rests against the steering column module. The screen, which is designed as a component of the steering column module, either rests against the rear side of the steering wheel or sinks into the free space of a steering wheel rim of the steering wheel. The steering column module is preferably completely, and the steering wheel is at least partially, countersunk into a recess in the dashboard. The push switches and lever switches optionally situated at the edge of the steering column module are thus concealed by the steering wheel and the edges of the recess in the dashboard.

BRIEF DESCRIPTION OF THE DRAWINGS

An operating arrangement of a motor vehicle in accordance with an exemplary embodiment of the present invention is illustrated with reference to the drawings and explained in greater detail below. A steering wheel, a steering column module, and a steering column of the operating arrangement is illustrated in each of the figures. Some figures also show a detail of a dashboard of the vehicle on which the operating arrangement is situated.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
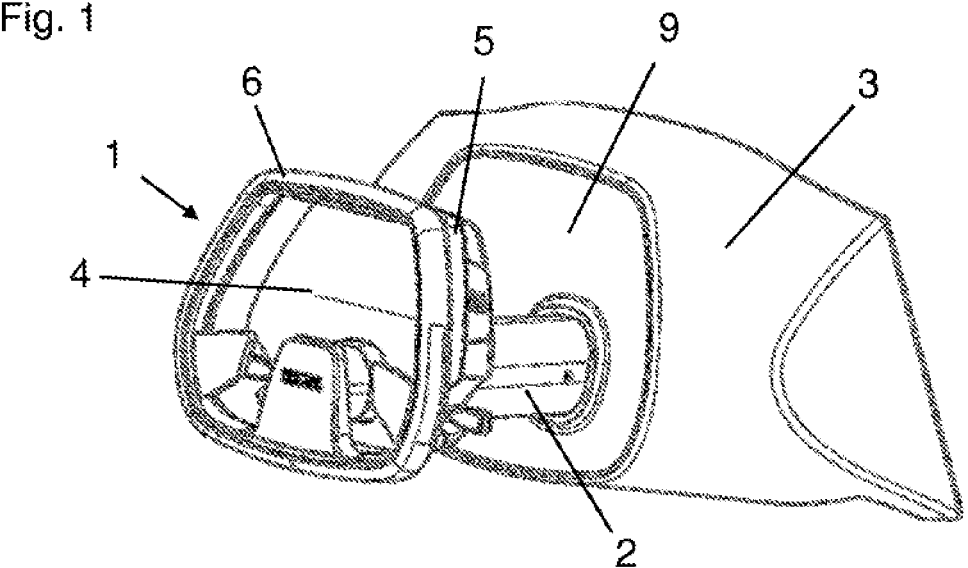
FIGS. 1, 2, and 3 each illustrate different views of the steering wheel and the steering column module being in a first position corresponding to a manual driving mode of the vehicle.
Figure 2:
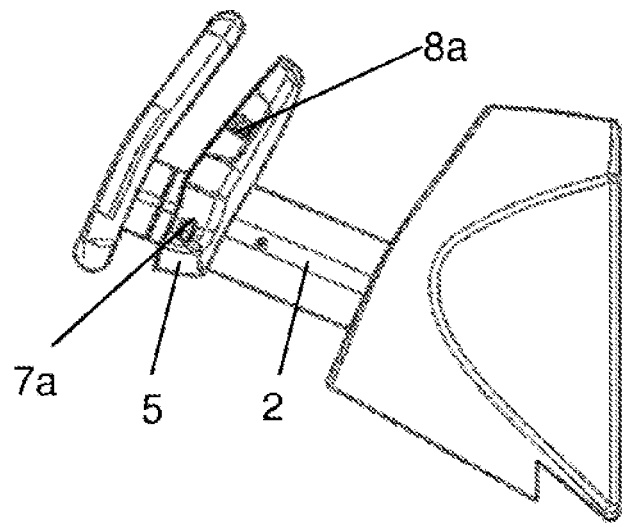
Figure 3:
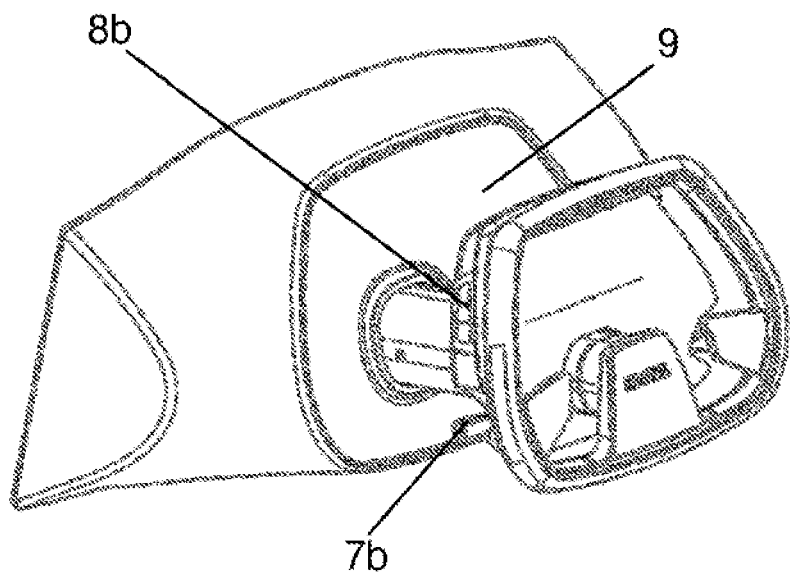

Referring now to FIGS. 1, 2, and 3, an operating arrangement for a motor vehicle is shown. The operating arrangement includes a steering wheel 1 and a steering column 2. Steering wheel 1 is situated on an end of steering column 2. Steering column 2 is mounted on a dashboard 3 of the vehicle. Steering column 2 is retractable into and extendable out of dashboard 3 by a steering column actuating mechanism (not shown). As such, the length of the portion of steering column 2 that protrudes into the interior of the vehicle is adjustable. Consequently, steering wheel 1 situated on the end of steering column 2 may assume various positions relative to dashboard 3.

The operating arrangement further includes a steering column module 5. Steering column module 5 is arranged on steering column 2 a short distance behind steering wheel 1. As such, steering column module 5 is between steering wheel 1 and dashboard 3. Steering column module 5 has a screen 4. Screen 4 is a relatively large-surface display element. Due to the short distance from steering wheel 1, screen 4 is in a position that is easily accessible to the driver. As such, screen 4 may also be advantageously designed as a touchscreen.

Steering column module 5, whose front face forms screen 4, also has multiple switch units 7a, 7b, 8a, 8b situated on the side of screen 4 (i.e., the edge of steering column module 5). In this exemplary embodiment, the switch units are designed as push switches 8a, 8b and as lever switches 7a, 7b. Lever switches 7a, 7b may in particular be the directional signal light and windshield wiper switches that are typically situated in the area of steering column 2.

The vehicle is operable in at least a manual driving mode and an automatic driving mode. In the following discussion, it is assumed that the vehicle may assume three different driving modes, referred to as manual, semi-automatic, and automatic driving modes, corresponding to an appropriate configuration of the vehicle control.

Figure 4:
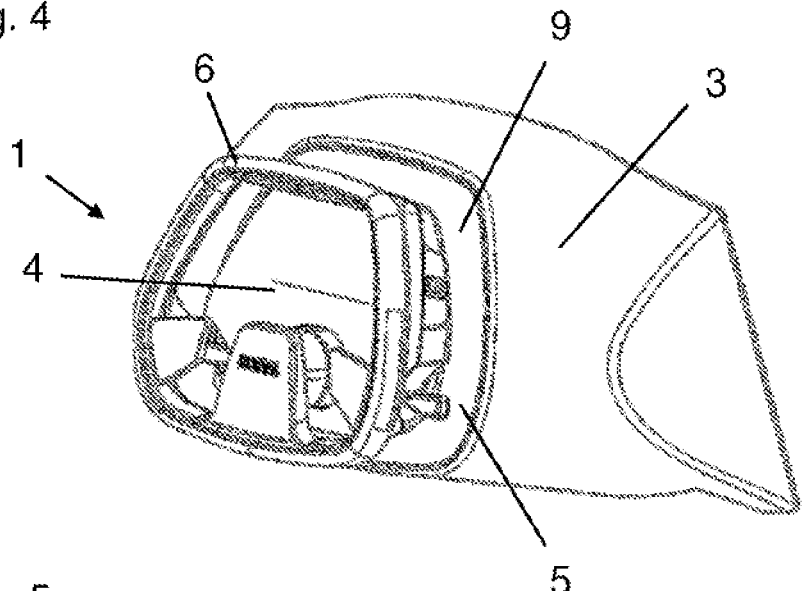
FIGS. 4, 5, and 6 each illustrate different views of the steering wheel and the steering column module being in a second position corresponding to a semi-automatic (i.e., semi-autonomous) driving mode of the vehicle.
Figure 5:
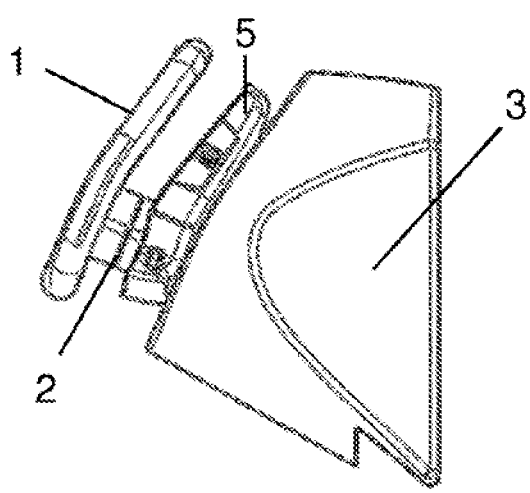
Figure 6:
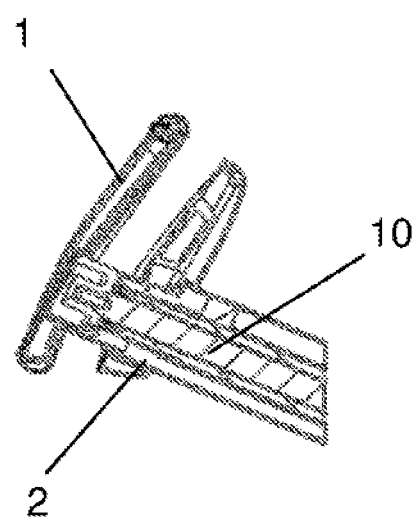
Figure 7:
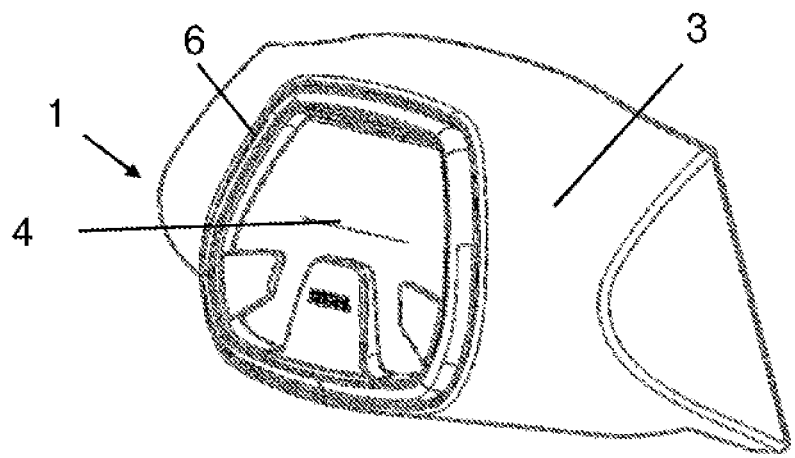
FIGS. 7, 8, and 9 each illustrate different views of the steering wheel and the steering column module being in a third position corresponding to an automatic (i.e., autonomous) driving mode of the vehicle.
Figure 8:
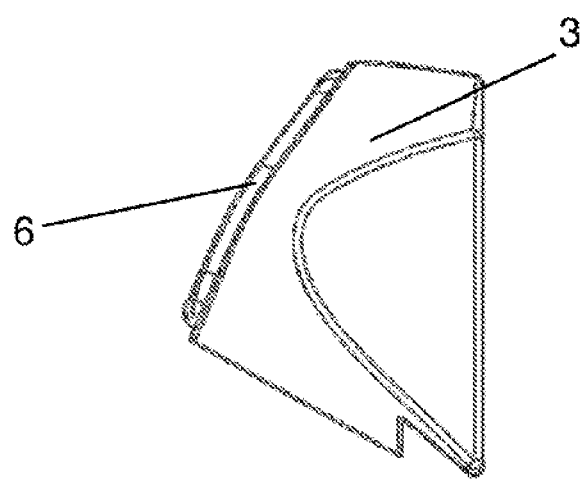
Figure 9:
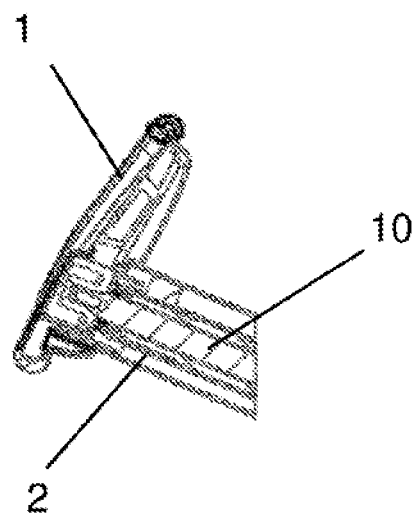

The operating arrangement is configured such that steering wheel 1 and steering column module 5 are positioned differently for the different driving modes. In this regard, FIGS. 1, 2, and 3 each illustrate different views of steering wheel 1 and steering column module 5 being in a first position corresponding to a manual driving mode of the vehicle. FIGS. 4, 5, and 6 each illustrate different views of steering wheel 1 and steering column module 5 being in a second position corresponding to a semi-automatic (i.e., semi-autonomous) driving mode of the vehicle. FIGS. 7, 8, and 9 each illustrate different views of steering wheel 1 and steering column module 5 being in a third position corresponding to an automatic (i.e., autonomous) driving mode of the vehicle.

These positions are automatically set by the steering column actuating mechanism, depending on the current active driving mode. Three positions of steering wheel 1 and steering column module 5 are illustrated in FIGS. 1, 4, and 7 by way of example.

The manual driving mode corresponds to the conventional vehicle control by a user, who steers the vehicle by turning the steering wheel, and who may therefore be referred to as the driver of the vehicle in the customary sense. In the manual driving mode, steering column 2 is extended relatively far from dashboard 3 so that steering wheel 1 and steering column module 5 are positioned away from dashboard 3 with steering wheel 1 being in an actuating position that is favorable for the driver.

This position of steering wheel 1 and steering column module 5 is illustrated from various perspectives in FIGS. 1, 2, and 3. The side view in FIG. 2 shows that steering column module 5 is situated at a distance of a few centimeters behind steering wheel 1, approximately in parallel thereto, so that switch units 7a, 7b, 8a, 8b are easily accessible from the hand positions on steering wheel 1.

FIGS. 4, 5, and 6 show the same control elements in the semi-automatic driving mode of the vehicle. This driving mode is characterized in that the primary user of the vehicle does not directly control the vehicle, but merely monitors the control of the vehicle that is taking place automatically. The user's hands are typically not on steering wheel 1, and also normally do not actuate switch units 7a, 7b, 8a, 8b of steering column module 5. However, the primary user may access steering wheel 1 and switch units 7a, 7b, 8a, 8b at any time and override the automatic control of the vehicle by actuation.

However, use is typically made of this option only in exceptional situations; otherwise, it would be more appropriate to use the manual driving mode. Therefore, for the semi-automatic driving mode it may advantageously be provided to remove steering wheel 1 and steering column module 5 from the most ergonomically favorable position to increase the free space in the interior of the vehicle.

A comparison of FIGS. 1 and 4 shows that the distance between steering wheel 1 and steering column module 5 and dashboard 3 is greatly reduced in the semi-automatic driving mode. This is achieved by steering column 2 being partially retracted into dashboard 3 by the steering column actuating mechanism. The partial retraction of steering column 2 into dashboard 3 causes steering column module 5 to be positioned adjacent to dashboard 3 as shown in FIG. 5. A comparison of FIGS. 2 and 5 shows that the distance between steering wheel 1 and steering column module 5 does not change.

FIGS. 7, 8, and 9 show the same control elements in the automatic driving mode of the vehicle. In the automatic operation, actuating access by the user is not required for either steering wheel 1 or steering column module 5 and therefore is not provided. Steering wheel 1 and steering column module 5 may thus be completely removed from the access area of the primary user. FIGS. 7 and 8 show that steering column 2 is retracted into dashboard 3 only far enough for steering column module 5 to rest closely against dashboard 3.

It is particularly clear in FIG. 2 and apparent in the sectional views in FIGS. 6 and 9 that steering column module 5 is directly connected to steering column 2. In contrast, steering wheel 1 is coupled to an end of a steering shaft 10 extending out of steering column 2. Steering shaft 10 is rotatably supported within steering column 2. Steering shaft 10 is displaceable axially with respect to steering column 2 (i.e., steering shaft 10 is retractable and extendable relative to steering column 2). Consequently, steering shaft 10 may be displaced axially with respect to steering column 2 to thereby change the distance between steering wheel 1 and steering column 5.

In the manual and the semi-autonomous driving modes, steering shaft 10 is extended the same distance relative to steering column 2 to thereby position steering wheel 1 spaced apart from steering column module 5 at a given distance as shown in FIG. 2 for the manual driving mode and in FIGS. 5 and 6 for the semi-autonomous driving mode.

In contrast, in the automatic driving mode, steering shaft 10 is retracted relative to steering column 2 such that steering wheel 1 is positioned against steering column module 5 with screen 4 resting against steering wheel 1 as shown in FIGS. 7, 8, and 9. That is, in the automatic driving mode, the distance between steering wheel 1 and steering column module 5 is shortened far enough so that steering column module 5 rests against the rear side of steering wheel 1. Screen 4 thus rests against the rear side of steering wheel rim 6 or even sinks into the space enclosed by steering wheel rim 6.

According to FIGS. 7 and 8, in the automatic driving mode, steering column module 5 is completely, and steering wheel 1 is at least partially, countersunk into a recess 9 in dashboard 3. In this position of steering column module 5, the displays on screen 4 are still clearly discernible through the free space of steering wheel rim 6. Trough-like recess 9 within dashboard 3 is illustrated in FIGS. 1, 3, and 4.

When the automatic driving mode is initiated, it may also be advantageously provided that the switching levers of lever switches 7a, 7b, which may possibly protrude far from steering column module 5 to be retracted into steering column module 5 or folded down against it by an actuator.

LIST OF REFERENCE NUMERALS 1 steering wheel
2 steering column
3 dashboard
4 screen
5 steering column module
6 steering wheel rim
7a, 7b, 8a, 8b switch units
7a, 7b lever switch
8a, 8b push switch
9 recess (in the dashboard)
10 steering shaft While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An operating arrangement for a vehicle operable in a manual driving mode and in an automatic driving mode, the operating arrangement comprising:
   a steering column that is retractable into and extendable out of a dashboard, the steering column having a steering shaft that is retractable and extendable relative to the steering column;
   a steering wheel on an end of the steering shaft;
   a steering column module arranged on the steering column between the steering wheel and the dashboard, the steering column module having a screen positioned behind the steering wheel;
   wherein, in the manual driving mode, the steering column is extended out of the dashboard to position the steering wheel and the steering column module away from the dashboard; and
   wherein, in the automatic driving mode, the steering column is retracted into the dashboard to position the steering column module against the dashboard and the steering shaft is retracted relative to the steering column to position the steering wheel adjacent the dashboard with the screen resting against the steering wheel.

2. The operating arrangement of claim 1 wherein:
   the steering wheel includes a steering wheel rim; and
   in the automatic driving mode, the steering shaft is retracted far enough relative to the steering column such that the screen is sunk into a free space within the steering wheel rim.

3. The operating arrangement of claim 1 wherein:
   the steering column module has at least one switch unit situated off from the screen on at least one side of the steering column module.

4. The operating arrangement of claim 3 wherein:
   at least one of the at least one switch unit is lever switch.

5. The operating arrangement of claim 3 wherein:
   at least one of the at least one switch unit is a push switch.

6. The operating arrangement of claim 3 wherein:
   in the automatic driving mode, the at least one switch unit is concealed by the steering wheel and/or edges of the dashboard to be inaccessible.

7. The operating arrangement of claim 3 wherein:
   in the manual driving mode, the at least one switch unit is exposed to be accessible.

8. The operating arrangement of claim 1, wherein the vehicle is further operable in a semi-automatic driving mode, wherein:
   in the semi-automatic driving mode, the steering column is partially retracted into the dashboard to position the steering column module adjacent to the dashboard.

9. The operating arrangement of claim 8 wherein:
   the steering column module has at least one switch unit situated off from the screen on at least one side of the steering column module; and
   in the semi-automatic driving mode, the at least one switch unit is exposed to be accessible.

10. The operating arrangement of claim 1 wherein:
    the screen is a touchscreen.

11. The operating arrangement of claim 1 wherein:
    the screen is a front face of the steering column module.

12. A vehicle operable in a manual driving mode and in an automatic driving mode, the vehicle comprising:
    a dashboard;

a steering column that is retractable into and extendable out of the dashboard, the steering column having a steering shaft that is retractable and extendable relative to the steering column;

a steering wheel on an end of the steering shaft;

a steering column module arranged on the steering column between the steering wheel and the dashboard, the steering column module having a screen positioned behind the steering wheel;

wherein, in the manual driving mode, the steering column is extended out of the dashboard to position the steering wheel and the steering column module away from the dashboard; and wherein, in the automatic driving mode, the steering column is retracted into the dashboard to position the steering column module against the dashboard and the steering shaft is retracted relative to the steering column to position the steering wheel adjacent the dashboard with the screen resting against the steering wheel.

13. The vehicle of claim 12 wherein:

the dashboard includes a recess; and in the automatic driving mode, the steering column is retracted far enough into the dashboard such that the steering column module is completely countersunk into the recess of the dashboard and the steering shaft is retracted far enough relative to the steering column such that the steering wheel is at least partially countersunk into the recess of the dashboard.

14. The vehicle of claim 12 wherein:

the steering wheel includes a steering wheel rim; and in the automatic driving mode, the steering shaft is retracted far enough relative to the steering column such that the screen is sunk into a free space within the steering wheel rim.

15. The vehicle of claim 12 wherein:

the steering column module has at least one switch unit situated off from the screen on at least one side of the steering column module;

in the manual driving mode, the at least one switch unit is exposed to be accessible for use by a driver of the vehicle; and in the automatic driving mode, the at least one switch unit is concealed by the steering wheel and/or edges of the dashboard to be inaccessible for use by a driver of the vehicle.

16. The vehicle of claim 12, wherein the vehicle is further operable in a semi-automatic driving mode, wherein:

in the semi-automatic driving mode, the steering column is partially retracted into the dashboard to position the steering column module adjacent to the dashboard.

17. The vehicle of claim 16 wherein:

the steering column module has at least one switch unit situated off from the screen on at least one side of the steering column module; and in the semi-automatic driving mode, the at least one switch unit is exposed to be accessible for use by a driver of the vehicle.

18. An operating arrangement for a vehicle operable in a manual driving mode and in an automatic driving mode, the operating arrangement comprising:

a steering column that is retractable into and extendable out of a dashboard;

a steering shaft that is retractable and extendable relative to the steering column, the steering shaft having an end extending out of the steering column;

a steering wheel connected to the end of the steering shaft;

a steering column module mounted on the steering column between the steering wheel and the dashboard, the steering column module having a screen positioned behind the steering wheel;

wherein, in the manual driving mode, (i) the steering column is extended out of the dashboard to position the steering wheel and the steering column module away from the dashboard and (ii) the steering shaft is extended relative to the steering column such that the steering wheel is spaced apart from the steering column module at a given distance; and wherein, in the automatic driving mode, (i) the steering column is retracted into the dashboard to position the steering column module against the dashboard and (ii) the steering shaft is retracted relative to the steering column such that the steering wheel is positioned against the steering column module with the screen resting against the steering wheel.

19. The operating arrangement of claim 18 wherein the vehicle is further operable in a semi-automatic driving mode, wherein:

in the semi-automatic driving mode, (i) the steering column is partially retracted into the dashboard to position the steering column module adjacent to the dashboard and (ii) the steering shaft is extended relative to the steering column such that the steering wheel is spaced apart from the steering column module at the given distance.

20. The operating arrangement of claim 19 wherein:

the steering column module has at least one switch unit situated off from the screen on at least one side of the steering column module;

in the manual driving mode, the at least one switch unit is exposed to be accessible;

in the semi-automatic driving mode, the at least one switch unit is exposed to be accessible; and in the automatic driving mode, the at least one switch unit is concealed by the steering wheel and/or edges of the dashboard to be inaccessible.

\* \* \* \* \*